Dec. 11, 1934.    G. R. ECKSTEIN    1,983,603

VISCOSITY INDICATING DEVICE

Filed July 17, 1931

Inventor
George R. Eckstein
By Popp and Powers
Attorneys

Patented Dec. 11, 1934

1,983,603

UNITED STATES PATENT OFFICE 1,983,603

VISCOSITY INDICATING DEVICE

George R. Eckstein, Buffalo, N. Y., assignor to Visco Meter Corporation, Buffalo, N. Y., a corporation of New York Application July 17, 1931, Serial No. 551,451

8 Claims. (Cl. 265—11)

This invention relates to devices for continuously indicating the viscosity conditions of a liquid which because of its environment is subject to changes in viscosity More particularly the invention is concerned with improvements in devices of the type disclosed in the co-pending application of Albert B. Shultz, Serial No. 511,796, filed January 28th, 1931.

A device of this type is capable of indicating the viscosity of a liquid without subjecting it to changes in temperature to a degree such as to impair the accuracy of the indication. In general, the device consists of a compact unit in the form of a fitting, the body of which is formed with a metering chamber to which the liquid is supplied at a constant pressure and this chamber communicates respectively with a resistance passage and with a tube leading to a suitable indicator or gauge. The resistance passage offers a resistance to the flow of the liquid through it, which resistance will vary in accordance with the viscosity of the liquid. The resistance offered by the said passage creates a counter, or back, pressure in the metering chamber which is measured by the indicator or gauge and inasmuch as the counter, or back, pressure will vary with variations in the resistance offered to the flow of the liquid by the resistance passage, the readings of the indicator or gauge may be availed of to indicate the viscosity of the liquid.

The principal object of the present invention is to provide filtering means within the body of the device capable of use over prolonged periods without the necessity of cleaning.

A further object is to provide a construction in which the resistance passage and metering chamber are accessible for cleaning by the removal of a few parts, said parts also being adapted to facilitate cleaning or replacement of the filtering means.

A further object is to simplify the construction so as to reduce the cost of production and facilitate assembly of the parts of the device.

Devices embodying features of the invention have particular utility in connection with the lubricating system of an internal combustion engine and although the invention is not limited to such use, it is so illustrated by way of example.

The invention is illustrated in the accompanying drawing in which.

In connection with automobile engines it is the practice to utilize a gauge for indicating the pressure under which the lubricant in the lubricating system is caused to circulate and for this purpose the latter includes a fitting by which the gauge is connected in the system, the fitting being secured for convenience upon an outer wall of the engine.

Figure 1:
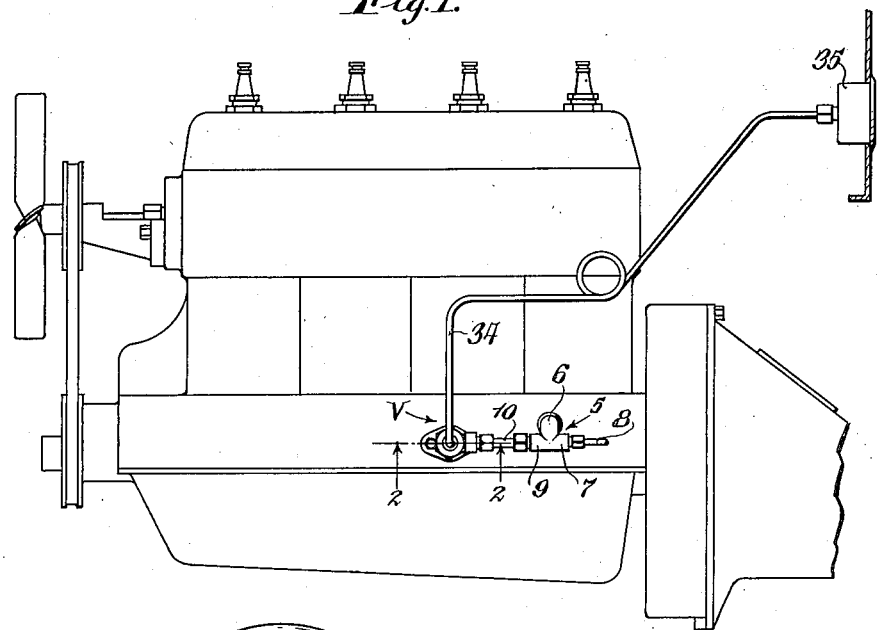
Figure 1 is a side elevation of an automobile engine equipped with the device in which the features of the invention are incorporated.
Figure 2:
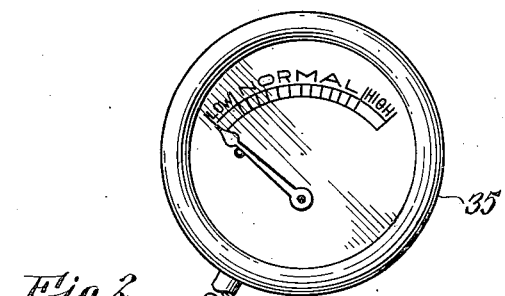
Figure 2 is an enlarged section taken along line 2—2, of Figure 1.
Figure 3:
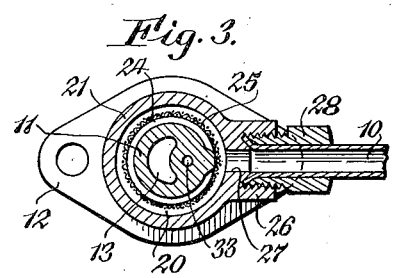
Figure 3 is a section taken along line 3—3 of Figure 2.
Figure 4:
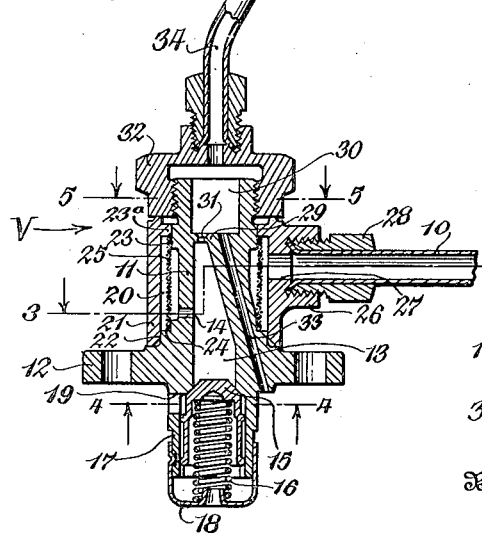
Figure 4 is a section taken along line 4—4 of Figure 2.
Figure 5:
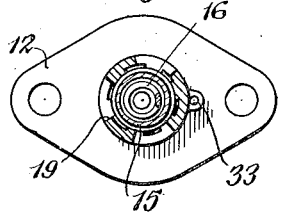
Figure 5 is a section taken along line 5—5 of Figure 2, those portions of the device below the said line being omitted.

When employed in connection with such a system, the device may be conveniently included in the system through the same medium as the pressure gauge, that is to say, by the pressure gauge fitting, although the connection may be made otherwise if desired. The fitting 5, as illustrated in Figure 1, is preferably of a standard T construction, its central inlet 6 being suitably connected to the piping of the lubricating system. The arrangement of the piping is not material and hence is not illustrated. One arm 7 of the fitting is intended for connection with the usual oil pressure gauge (not shown) through a pipe 8 while the other arm 9 is availed of for connecting the viscosity indicating device V in the lubricating system. The arm 9 of the fitting, therefore, is connected to the said device by a pipe 10.

The device V, as illustrated, comprises a body 11, which may be in the form of a casting and which is provided with suitable means for effecting its securement to an engine, for example, an attachment flange 12. The body is formed with a central chamber 13 to which the liquid is delivered through a laterally extending opening 14, the latter being restricted to such an extent as to prevent diversion of too great a quantity of lubricant from the system.

The bottom of the chamber 13 is provided by a valve 15 which is urged toward the valve seat formed in the body 11 by a suitable spring 16. The valve 15 and spring 16 are mounted in a sleeve-like extension 17 formed with or carried by the body 11, the extension being provided at its outer end with a cap-piece 18 against which the spring 16 bears. The valve 15 is designed to maintain the lubricant in the chamber 13 under a substantially constant pressure. Lubricant is normally supplied to the chamber 13 at such a rate that the pressure will exceed the value desired unless a portion of the lubricant is permitted to escape. The valve 15, therefore, opens to permit the escape of the excess lubricant, thereby maintaining the lubricant in the chamber 13 under a constant pressure. The lubricant which flows past the valve 15 escapes through suitable openings 19 formed in the sleeve-like extension 17. The body 11 is preferably secured to the engine so that the extension 17 extends through a wall thereof and hence the excess lubricant passes through the openings 19 directly back into the crank-case.

The lubricant which enters the chamber 13 through the opening 14 is first filtered. To this end, the opening 14 is in communication with a filtering chamber 20, the latter being provided by a cylindrical member 21 which fits over the body 11. The member 21 at its lower end fits tightly against an annular shoulder 22 of the body 11 while at its upper end it is formed with an internal annular rib 23ª which engages an annular shoulder 23 formed on the said body. Adjacent the shoulder 22 the body 11 is formed with a second shoulder 24, the shoulders 23 and 24 serving to support, by its opposite ends, a filtering element 25 which may be of any suitable material such as, for example, wire mesh, the said element being supported in the filtering chamber throughout the greater portion of its extent in spaced relation with respect to the adjacent walls respectively of the body 11 and member 21. It will be noted that the cross sectional area of the opening 14 is comparatively negligible as compared to the active area of the filtering element. This has the advantage that the device is capable of accurate and reliable operation over prolonged periods of use without the necessity of cleaning or replacement of the filtering element. The spacing of the said element at a distance from the adjacent walls of the body 11 and member 21 insures the presentation of a large area of the element to the lubricant entering the filtering chamber and also insures a clear passage for the lubricant, which has passed through the element at various points, to the opening 14. The filtering element 25 may be easily removed for cleaning or replacement by removing the cap 32 and member 21. The latter is provided with a lateral extension 26 in which an inlet opening 27 is formed. The filtering chamber 20 is supplied with lubricant from the lubricating system by the pipe 10, the connection between the latter and the device V being effected by means of a suitable nut 28.

It is to be noted that the member 21 serves two purposes. First, it co-operates with the body 11 of the device to provide the filtering chamber 20. It also is utilized in connecting the device in the lubricating system. In accordance with the invention, the said member is, therefore, designed for angular adjustment about the body 11, this being particularly desirable in connection with the installation of the device. The member 21 may be quickly and conveniently adjusted, when the cap 32 is loose, to that point at which its connection with the pipe 10 may be made most conveniently, thereby expediting the installation of the device.

The chamber 13 narrows in the direction of its inner end and at its inner end, the body is formed with a web 29 which forms a partition between the chamber 13 and a metering chamber 30. Communication between the chamber 13 and the metering chamber is afforded by an orifice 31 formed in the partition 29.

The metering chamber 30 is formed in the upper end of the body 11 and is closed by a cap 32 which threadedly engages the upper end of the said body. The cap 32 engages the upper end of the member 21 and is utilized to hold the said member against movement. The metering chamber 30 is in communication with an elongated passage 33 which extends from the said chamber angularly across the chamber 13, terminating at its outer end adjacent the base of the extension 17. The lubricant discharges from the metering chamber 30 through the passage 33, and returns, together with the excess lubricant discharged through the openings 19, to the crank case. The passage 33, however, is designed to offer resistance to the flow of lubricant in accordance with its viscosity so that a counter, or back, pressure is set up. It will be noted that the resistance passage 33 is incorporated directly in the body 11 and its walls will be of the same temperature as the said body. When the latter is secured to the crank case of the engine it will be of substantially the same temperature as the crank-case. This is desirable, of course, as the lubricant flowing through the passage 33 will be of substantially the same temperature as the lubricant in the crank case, hence an accurate indication of the viscosity of the lubricant under actual operating conditions is given. The formation of the body 11 so as to permit the resistance passage to open directly into the metering chamber 30 has the advantage that the latter is readily accessible for the purpose of cleaning by removing the cap 32, thereby avoiding the necessity of detaching the device from the engine. It will be apparent that not only is the passage 33 accessible for cleaning by removal of the cap 32 but the orifice 31 is likewise accessible. The filtering element is also quickly and easily accessible for cleaning by the removal of the cap 32 and sleeve 21 without the necessity of disturbing the connection by which the casting is supported.

It is the practice to cause the lubricant in the lubricating system to circulate under a pressure great enough to force the lubricant to all surfaces requiring lubrication, this being accomplished by a suitable pump. The device V being connected in the lubricating system, it follows that lubricant is supplied by the pipe 10 to the filtering chamber 20 from which it flows through the opening 14 into the chamber 13, the valve 15 maintaining the pressure in the said chamber constant by permitting escape of the excess lubricant. The lubricant in the chamber 13, therefore, is forced through the orifice 31 under a substantially constant head or pressure. As the rate of flow through the resistance passage 33 varies with variations in the viscosity of the lubricant, there will be corresponding pressure variations in the metering chamber 31. Thus, by translating pressure units into viscosity units, the viscosity of the lubricant may be determined. To this end, the chamber 30 is connected by means of a tube 34 to a pressure gauge 35, the dial of which is divided into convenient viscosity units.

It will be apparent that the means by which the lubricant, the viscosity of which is to be determined, is filtered is incorporated within the device itself, said means presenting such a large active area to the lubricant as compared to the cross-sectional area of the opening by which the lubricant enters the metering chamber that the device is capable of prolonged periods of use without impairment of the accuracy of its indications. However, the filtering means as well as the various passages and chambers in the body of the device are conveniently accessible and may be cleaned when necessary without disturbing in any way the piping of the system or the connection by which the device is supported on the engine. The device may be quickly and conveniently installed, this being facilitated by the adjustable member 21 by which the device is included in the lubricating system.

I claim as my invention:

1. A device for indicating the viscosity of a liquid in a system in which the liquid is caused to flow including a body, a member fitting about said body, the adjacent walls of said body and member being spaced throughout a portion of their extent to provide a chamber, means in said chamber for filtering the liquid delivered to it, said body being formed with a second chamber, means for maintaining the liquid in said last mentioned chamber under a substantially constant pressure, a metering chamber formed in said body and in communication with said second chamber, an outlet passage formed in said body and communicating with said metering chamber, said passage being adapted to offer resistance to the flow of liquid in accordance with its viscosity, thereby setting up a counter pressure in said metering chamber, an indicator and means whereby said indicator is connected to said metering chamber so as to be responsive to such counter pressure.

2. A device for indicating the viscosity of a liquid in a system in which the liquid is caused to flow including a body, a member fitting about said body, the adjacent walls of said body and member being spaced throughout a portion of their extent to provide a chamber, an element in said chamber and spaced from the walls thereof for filtering the liquid in said chamber, said body being formed with a second chamber to which the liquid from the filtering chamber is delivered, means for maintaining the liquid in said last mentioned chamber under a substantially constant pressure, a metering chamber formed in said body and in communication with said second chamber, an outlet passage formed in said body and communicating with said metering chamber, said passage being adapted to offer resistance to the flow of liquid in accordance with its viscosity, thereby setting up a counter pressure in said metering chamber, an indicator and means whereby said indicator is connected to said metering chamber so as to be responsive to such counter pressure.

3. A device for indicating the viscosity of a liquid in a system in which the liquid is caused to flow including a body, a removable member fitting about said body, the adjacent walls of said body and member being spaced throughout a portion of their extent to provide a chamber, a filtering element fitting about said body in said chamber and spaced from the side walls thereof, means for holding said member and said element in assembled relation, said means being removable to enable cleaning or replacement of said element, said body being formed with a second chamber to which the filtered liquid is delivered from the filtering chamber, means for maintaining the liquid in said last mentioned chamber under a substantially constant pressure, a metering chamber formed in said body and in communication with said second chamber, an outlet passage formed in said body and communicating with said metering chamber, said passage being adapted to offer resistance to the flow of liquid in accordance with its viscosity, thereby setting up a counter pressure in said metering chamber, an indicator and means whereby said indicator is connected to said metering chamber so as to be responsive to such counter pressure.

4. A device for indicating the viscosity of a liquid in a system in which the liquid is caused to flow including a body provided with a chamber to which the liquid is delivered from said system, means for maintaining the liquid in said chamber under a substantially constant pressure, a metering chamber formed in said body, a partition separating said chambers and formed with an orifice through which liquid may flow from the inlet chamber into the metering chamber, an outlet passage formed in said body and communicating with said metering chamber, said passage being adapted to offer resistance to the flow of liquid in accordance with its viscosity, thereby setting up a counter pressure in said metering chamber, an indicator, means whereby said indicator is connected to said metering chamber so as to be responsive to such counter pressure and an externally accessible removable element secured to said body and through which access may be had to said orifice and resistance passage for clearing the same.

5. A device for indicating the viscosity of a liquid in a system in which the liquid is caused to flow including a body, a member fitting about said body, the adjacent walls of said body and member being spaced throughout a portion of their extent to provide a chamber, an element in said chamber for filtering the liquid delivered to the latter, said body being formed with a second chamber to which the filtered liquid is delivered from the filtering chamber, means for maintaining the liquid in said second chamber under a substantially constant pressure, a metering chamber formed in said body and in communication with said second chamber, an outlet passage formed in said body and communicating with said metering chamber, said passage being adapted to offer resistance to the flow of liquid in accordance with its viscosity, thereby setting up a counter pressure in said metering chamber, an indicator, means whereby said indicator is connected to said metering chamber so as to be responsive to such counter pressure and an externally accessible removable closure element secured to said body and by which access may be had to said metering chamber and resistance passage for clearing the same, said element being adapted to hold said member and filtering element in assembled relation.

6. A device for indicating the viscosity of a liquid in a system in which the liquid is caused to flow including a body, a member fitting about said body, the adjacent walls of said body and member being spaced through a portion of their extent to provide a chamber, an element in said chamber for filtering the liquid delivered to the latter, said body being formed with a second chamber to which liquid from said filtering chamber is delivered, means for maintaining the liquid in said second chamber under a substantially constant pressure, a metering chamber formed in said body and in communication with said second chamber, an outlet passage formed in said body and communicating with said metering chamber, said passage being adapted to offer resistance to the flow of liquid in accordance with its viscosity, thereby setting up a counter pressure in said metering chamber, an indicator, means whereby said indicator is connected to said metering chamber so as to be responsive to such counter pressure and an externally accessible removable closure element secured to said body and by which access may be had to said metering chamber and resistance passage for clearing the same, said element being utilized in connecting the said indicator to said metering chamber.

7. A device for indicating the viscosity of a liquid in a system in which the liquid is caused to flow including a body, a member fitting about said body, the adjacent walls of said body and member being spaced throughout a portion of their extent to provide a chamber, an element in said chamber for filtering the liquid delivered to the latter, said body being formed with a second chamber to which liquid from said filtering chamber is delivered, means for maintaining the liquid in said second chamber under a substantially constant pressure, a metering chamber formed in said body and in communication with said second chamber, an outlet passage formed in said body and communicating with said metering chamber, said passage being adapted to offer resistance to the flow of liquid in accordance with its viscosity, thereby setting up a counter pressure in said metering chamber, an indicator, means whereby said indicator is connected to said metering chamber so as to be responsive to such counter pressure and an externally accessible removable closure element secured to said body and by which access may be had to said metering chamber and resistance passage for clearing the same, said element being utilized in connecting the said indicator to said metering chamber and serving to hold said member and filtering element in assembled relation.

8. A device for indicating the viscosity of a liquid in a system in which the liquid is caused to flow including a body, a member fitting over said body, the adjacent walls of said body and member being spaced throughout a portion of their extent to provide a chamber, means for filtering the liquid delivered to said chamber, said body being formed with a second chamber to which the filtered liquid is delivered, means for maintaining the liquid in said second chamber under a substantially constant pressure, a metering chamber formed in said body and in communication with said second chamber, an outlet passage formed in said body and communicating with said metering chamber, said passage being adapted to offer resistance to the flow of liquid in accordance with its viscosity, thereby setting up a counter pressure in said metering chamber, an indicator and means whereby said indicator is connected to said metering chamber so as to be responsive to such counter pressure, said means serving to hold said member and said body in assembled relation, said member being adjustable on said body to facilitate connection between said chamber first mentioned and said system.

GEORGE R. ECKSTEIN.